No. 694,075. Patented Feb. 25, 1902.
F. A. POCOCK & C. W. KENNEDY.
ELECTRIC MOTOR.
(Application filed July 29, 1897.)
(No Model.) 3 Sheets—Sheet 1.
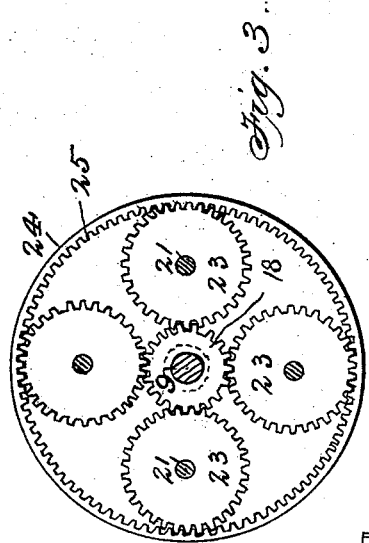
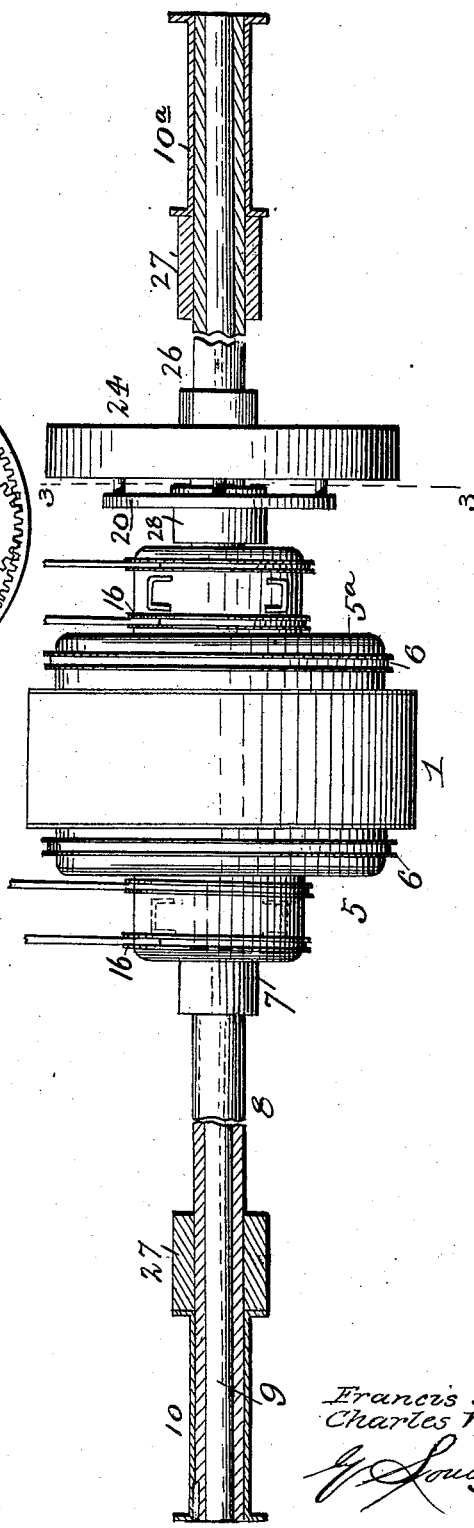
Witnesses:
Inventors:
Francis A. Pocock and
Charles W. Kennedy.
Attorneys

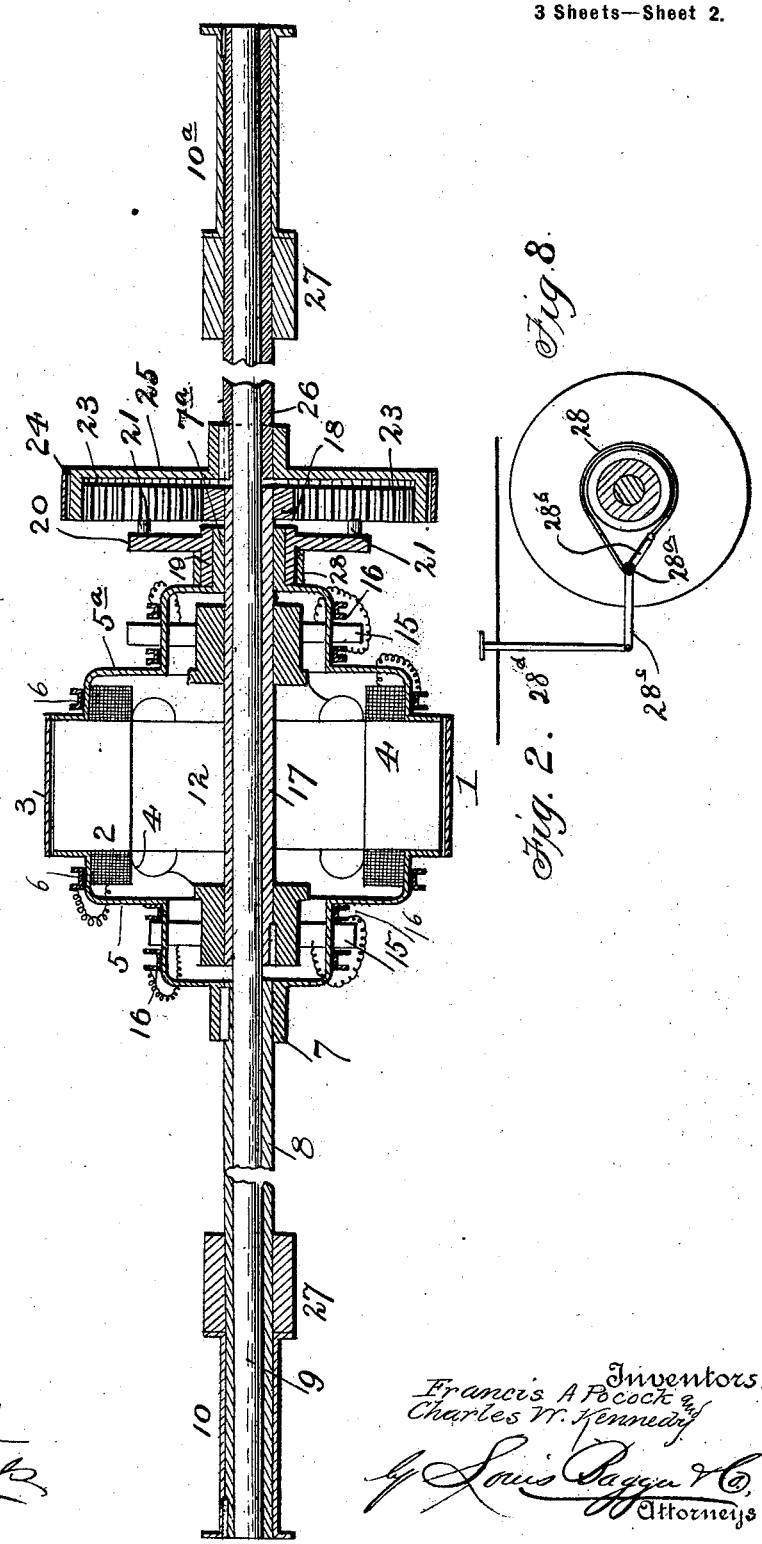

No. 694,075. Patented Feb. 25, 1902.
F. A. POCOCK & C. W. KENNEDY.
ELECTRIC MOTOR.
(Application filed July 29, 1897.)
(No Model.) 3 Sheets—Sheet 3.
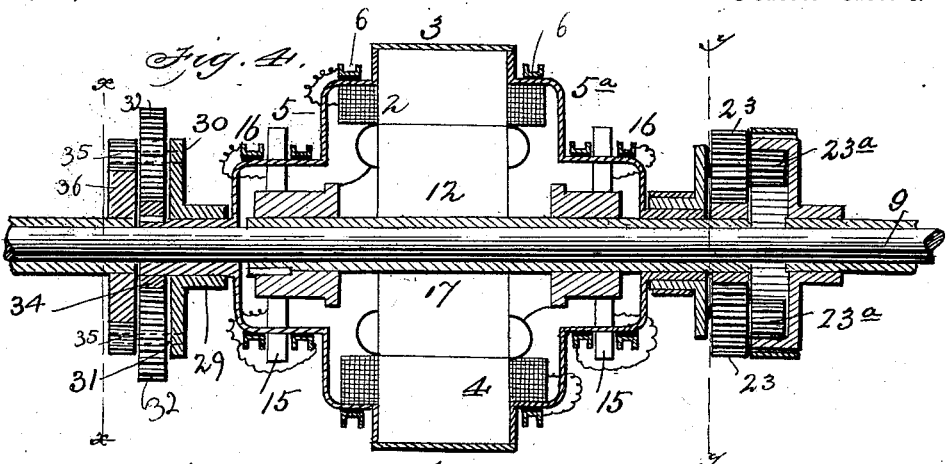
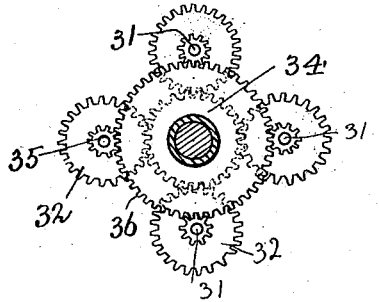
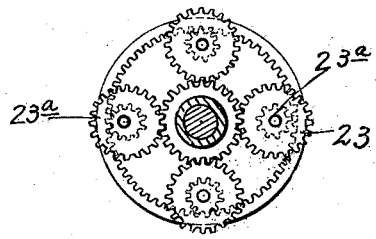
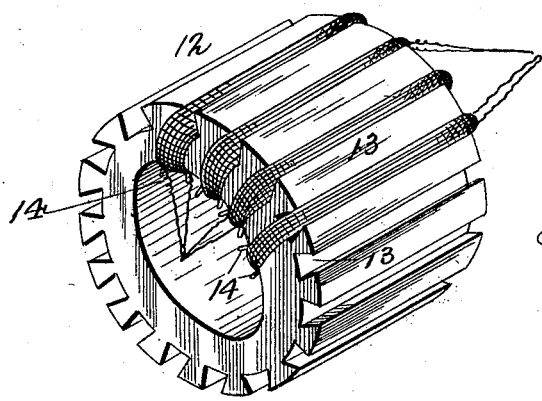
Witnesses:
Inventors:
Francis A. Pocock &
Charles W. Kennedy
Attorneys

UNITED STATES PATENT OFFICE.

FRANCIS AGNEW POCOCK, OF PHILADELPHIA, AND CHARLES W. KENNEDY, OF RUTLEDGE, PENNSYLVANIA, ASSIGNORS, BY MESNE ASSIGNMENTS, TO THE ELECTRIC POWER DEVELOPMENT COMPANY, OF PHILADELPHIA, PENNSYLVANIA.

ELECTRIC MOTOR.

SPECIFICATION forming part of Letters Patent No. 694,075, dated February 25, 1902.

Application filed July 29, 1897. Serial No. 646,386. (No model.)

*To all whom it may concern:*

Be it known that we, FRANCIS AGNEW POCOCK, a resident of Philadelphia, in the county of Philadelphia, and CHARLES W. KENNEDY, a resident of Rutledge, in the county of Delaware, State of Pennsylvania, have invented certain new and useful Improvements in Electric Motors; and we do hereby declare that the following is a full, clear, and exact description of the invention, which will enable others skilled in the art to which it appertains to make and use the same, reference being had to the accompanying drawings, which form a part of this specification.

Our invention relates to electric motors for cars, horseless carriages, and other vehicles; and its object is to provide an improved construction of the same in which the field-magnets and the armature are rotatable in opposite directions, the driving-wheels being entirely independent of each other and one connected with the field-magnets and the other connected through suitable gearing with the armature, so as to rotate in the same direction with the wheel connected with the field and at the same speed. The construction is also such that as long as the current is passing through the machine the armature is always in motion, whether the vehicle be moving or is at rest, the slowing up, stopping, and starting being effected by mechanical means without in any way affecting the current, but which may also be started and stopped, if desired, by making and breaking the current, as usual.

The invention consists in the novel construction and combination of parts hereinafter fully described and claimed.

In the accompanying drawings, Figure 1 is an elevation of an electric motor constructed in accordance with our invention. Fig. 2 is a longitudinal section of the same. Fig. 3 is a cross-section on the line $xx$, Fig. 1. Fig. 4 is a longitudinal section of a modified construction. Fig. 5 is a cross-section on the line $xx$, Fig. 4. Fig. 6 is a similar section on the line $yy$. Fig. 7 is a detail perspective view of the armature, showing the double windings thereon. Fig. 8 is a detail view of the strap-brake.

In the said drawings, referring now to Figs. 1, 2, 3, and 7, the reference-numeral 1 designates the motor, and 2 the field-magnets thereof, comprising the cylindrical ring 3, formed in its interior with a number of pole-pieces 4, which are shunt-wound in any ordinary or convenient manner. This ring is provided with end heads 5 and $5^a$, provided with positive and negative conducting-rings 6, with which the wire wound upon said pole-pieces is connected, by means of which the current is passed through said wire. One of these heads is provided with a bearing 7, which is securely fixed to a tube 8, which is rotatable on the axle 9 of the car, and secured to this tube is the wheel-hub 10. From this it will be seen that as the field rotates the ring and heads will rotate therewith, which will consequently rotate the tube and wheel.

The numeral 12 designates the oppositely-rotatable armature, provided with a number of longitudinal peripheral grooves 13, forming ways for the windings of the armature. The armature is a double-wound one—that is to say, it has a commutator at each end, with which the wires in the alternate grooves are respectively connected. The current in both series of windings must of course flow in the same direction. Said commutators are provided with positive and negative brushes 15, secured to the rotatable heads, which are connected with positive and negative conducting-rings 16, secured to the outside of said heads. The armature is secured to a tube 17, which is rotatable on the axle 9. The outer end of said tube is provided with a pinion 18, secured thereto. The end head $5^a$ is provided with a bearing $7^a$, rotatable on the tube 17, and rotatably mounted on this bearing is a collar 19, provided with a disk 20, to which are secured stud-shafts 21. Four of these shafts are shown in the present instance, although more or less may be employed, if desired. Mounted on these shafts are rotatable pinions 23, which mesh with the pinion 18 and also with an interiorly-toothed flange 24 of a wheel or disk 25, secured to a tube 26, rotatable on the axle 9 and to which the hub 10ᵃ of the other driving-wheel is secured.

The numeral 27 designates bearings, which support the tubes of the driving-wheels and are intended to be secured to the car or other vehicle.

The numeral 28 designates a strap-brake consisting of a strip of spring metal, one end of which is connected with a rock-shaft 28ᵃ and the other end connected with the arm 28ᵇ of an elbow-lever 28ᶜ, the other arm 28ᵈ of which projects up above the car-platform, so that by depressing said arm 28ᵈ the said strap will be brought into frictional contact with the disk 20. The driving-wheels are also provided with brakes, as usual; but when the motor is used with a horseless carriage having pneumatic tires the brake should bear upon the exterior of the field-magnet ring and the wheel or disk 25.

In practice for cars and other heavy vehicles we intend to use two motors, one for the axle of each pair of driving-wheels.

The motor is provided with a controller for regulating the speed and in the present instance is arranged to give four different speeds by the combination hereinafter described.

The operation is as follows: Supposing the car to be standing still, the controller is operated so as to run the motor at the maximum speed, and the brake being off the collar 19 the armature will rotate at the full speed of the motor, as there is no resistance to it, the pinions 23, carried by said collar, revolving around the pinion 18, and therefore not rotating the flange-wheel secured to the tube of the driving-wheel. The field-magnets will also be stationary, owing to the resistance between the other driving-wheel and the rail or ground. If it is now desired to start the car, the brake is applied to the collar, and, acting as a resistance thereto, the movement of said collar is retarded, causing the pinions 23 to rotate the disk 25 and the driving-wheel connected therewith, the speed at which the said disk is driven being governed by the pressure of the brake upon the collar and the consequent retardation to which the collar is subjected. At the same time the field-magnets will revolve in the opposite direction to the armature, rotating the other driving-wheel at the same speed as the driving-wheel connected with the gears, which latter wheel by reason of the gears turns in the same direction as the other driving-wheel. By this means the speed of the motor can be regulated irrespective of the controller and can be stopped by the brake without cutting off the current.

From the above it will be seen that the armature and field both rotating in starting the kinetic energy of the moving mass can be fully utilized, (for it is not necessary to stop the motor to bring the car at rest,) as by decreasing the resistance to gear collar any speed down to just moving can be obtained, which prevents the losses due to continual stopping and starting of the motor caused by crowded conditions and picking up and letting off passengers. As these cause the heaviest strains on the power-station, a reduction of them will materially lighten the maximum loads on the machinery and effect considerable saving.

The driving-wheels are entirely independent of each other, and so allow for different speeds of rotation in turning corners.

In Figs. 4 and 6 we have shown a modified construction of the gears between the armature and its driving-wheel. In this case the pinions 23 do not mesh with the flanged gear-wheel 25, but are provided with smaller pinions 23ᵃ, which mesh with said gear 25, making a double reduction, if required. The other driving-wheel in this case is also provided with intermediate gears arranged as follows: Journaled on the end head 5 is a collar 29, provided with a disk 30, having stud-shafts 31. These stud-shafts are provided with pinions 32, which mesh with a gear 34, secured to the end of said head. Said stud-shafts are also provided with smaller pinions 35, which mesh with a gear 36 on the inner end of the tube which carries the driving-wheel. These gears operate in a manner similar to those first above described.

Having thus fully described our invention, what we claim is—

1. In an electric motor, the combination with the armature and field-magnets adapted to rotate in opposite directions, of the central axle, the tube journaled on one end thereof to which the hub of a wheel is secured, the tube journaled on the other end of said axle to which the hub of another wheel is secured, the gear secured thereto, the tube journaled on said axle and secured to the armature, and gearing connected therewith engaging with said gear, substantially as described.

2. In an electric motor, the combination with the armature and field-magnets adapted to rotate in opposite directions, the central axle, the independent tubes journaled on the ends thereof, the wheel-hubs secured to said tubes, and the internal gear secured to the inner end of one of said tubes, of the tube journaled on said axle intermediate the ends of the same, to which the armature is secured, the pinion and the collar secured thereto, the disk secured to said collar, the stud-shafts and the pinions meshing with said pinion and with said internal gear, substantially as described.

3. In an electric motor, the combination with the armature and field-magnets adapted to rotate in opposite directions, the central axle, the independent tubes journaled on the ends thereof, the wheel-hubs secured thereto and the internal gear secured to the inner end of one of said tubes, of the tube journaled on said axle intermediate its ends and secured to the armature, the pinion at the outer end of said tube, the collar also secured to said tube, the disk secured to said collar, the stud-shafts, the pinions, and the strap-brake passing around said collar, and means for operating the same, substantially as described.

In testimony that we claim the foregoing as our own we have hereunto affixed our signatures in presence of two witnesses.

FRANCIS AGNEW POCOCK.
CHARLES W. KENNEDY.

Witnesses:
GEO. W. CLEMENT,
JAMES J. KANE.